United States Patent
Shimizu et al.

(10) Patent No.: US 10,511,002 B2
(45) Date of Patent: Dec. 17, 2019

(54) BATTERY MODULE

(71) Applicant: Panasonic Intellectual Property Management Co., Ltd., Osaka (JP)

(72) Inventors: Keisuke Shimizu, Osaka (JP); Daisuke Kishii, Osaka (JP); Takeshi Enomoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 200 days.

(21) Appl. No.: 15/501,980

(22) PCT Filed: Feb. 17, 2016

(86) PCT No.: PCT/JP2016/000819
§ 371 (c)(1),
(2) Date: Feb. 6, 2017

(87) PCT Pub. No.: WO2016/136193
PCT Pub. Date: Sep. 1, 2016

(65) Prior Publication Data
US 2017/0237055 A1  Aug. 17, 2017

(30) Foreign Application Priority Data
Feb. 25, 2015 (JP) .................... 2015-034967

(51) Int. Cl.
*H01M 2/12* (2006.01)
*H01M 2/10* (2006.01)

(52) U.S. Cl.
CPC ....... *H01M 2/1252* (2013.01); *H01M 2/1016* (2013.01); *H01M 2/1072* (2013.01); *H01M 2/1211* (2013.01)

(58) Field of Classification Search
CPC ......... H01M 10/0413; H01M 10/0445; H01M 10/052; H01M 10/12; H01M 10/613;
(Continued)

(56) References Cited

U.S. PATENT DOCUMENTS

| | | | |
|---|---|---|---|
| 8,802,254 B2* | 8/2014 | Lee ..................... | H01M 2/1223 429/53 |
| 2009/0169978 A1* | 7/2009 | Smith ................. | H01M 2/0242 429/82 |

FOREIGN PATENT DOCUMENTS

| | | |
|---|---|---|
| JP | 2007-179818 | 7/2007 |
| JP | 2007-538373 | 12/2007 |
| WO | 2014/065110 | 5/2014 |

OTHER PUBLICATIONS

International Search Report of PCT application No. PCT/JP2016/000819 dated May 24, 2016.

* cited by examiner

*Primary Examiner* — Barbara L Gilliam
*Assistant Examiner* — Adam A Arciero
(74) *Attorney, Agent, or Firm* — McDermott Will & Emery LLP (57) ABSTRACT

A battery module includes: a case body for storing a plurality of cells each having an exhaust gas valve; an exhaust passage for releasing, to the outside of the case body, the high-pressure and high-temperature exhaust gas having come from the cells; and a flow route changing unit that is disposed in the exhaust passage, has a hole for passing the exhaust gas, and elongates the flow route of the exhaust gas from the upstream side to the downstream side of the exhaust passage by changing the flow direction of the exhaust gas a plurality of times in a zigzag manner along at least one of the width and height directions of the exhaust (Continued)

passage. The flow route changing unit includes a plurality of flat plates each having a hole for passing the exhaust gas.

11 Claims, 5 Drawing Sheets

(58) Field of Classification Search
CPC .. H01M 10/615; H01M 10/647; H01M 10/10;
H01M 10/6557; H01M 10/6563; H01M
10/6567; H01M 2/0242; H01M 2/0277;
H01M 2/1252; H01M 2/30; H01M
2/1211; H01M 2/1072; H01M 2/1016
See application file for complete search history.

BATTERY MODULE

TECHNICAL FIELD

The present invention relates to a battery module.

BACKGROUND ART

In order to obtain a desired electric power, a battery module in which a plurality of cells are stored in one case body is employed. When gas is generated in the cells by a chemical reaction, the internal pressure becomes high. In order to release the high-pressure and high-temperature gas, each cell includes an exhaust gas valve, and the case body of the battery module includes a duct for releasing, to the outside, the exhaust gas exhausted from the cells.

When the high-pressure and high-temperature exhaust gas is released to the outside of the battery module without being treated, other components or apparatuses disposed around the battery module can be damaged. Patent Literature 1 discloses a structure in which a partition is disposed in the case body. In this structure, the high-pressure and high-temperature exhaust gas moves toward an internal-pressure release port disposed in the case body while circulating in the case body. Partitions having an uneven shape, a louver structure, a porous structure, and a mesh structure are described.

CITATION LIST

Patent Literature

PTL 1: International Patent Publication No. 2014/065110 brochure

SUMMARY OF THE INVENTION

It is desired to efficiently decrease the pressure and temperature of high-pressure and high-temperature exhaust gas that comes from cells constituting a battery module.

The battery module of the present invention includes the followings:

a case body for storing a plurality of cells each having an exhaust gas valve;

an exhaust passage for releasing, to the outside of the case body, the high-pressure and high-temperature exhaust gas having come from the cells; and a flow route changing unit that is disposed in the exhaust passage, has a hole for passing the exhaust gas, and elongates the flow route of the exhaust gas from the upstream side to the downstream side of the exhaust passage by changing the flow direction of the exhaust gas a plurality of times in a zigzag manner along at least one of the width and height directions of the exhaust passage.

The battery module of the present invention allows efficient decrease of the pressure and temperature of the high-pressure and high-temperature exhaust gas that comes from the cells.

DESCRIPTION OF EMBODIMENT(S)

Hereinafter, an exemplary embodiment of the present invention is described in detail with reference to the accompanying drawings. The number of cells, the dimensions of the holes for passing exhaust gas, and the number of the holes, which are described below, are examples for description. They can be appropriately changed depending on the specification or the like of a battery module. In the following all drawings, the same components are denoted with the same reference marks, and duplicate description is omitted.

Figure 1A:
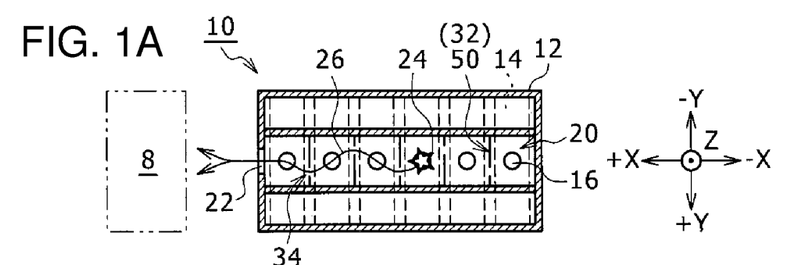
FIG. 1A is a top sectional view of a battery module in accordance with an exemplary embodiment of the present invention taken along line IA-IA of FIG. 1B.
Figure 1B:
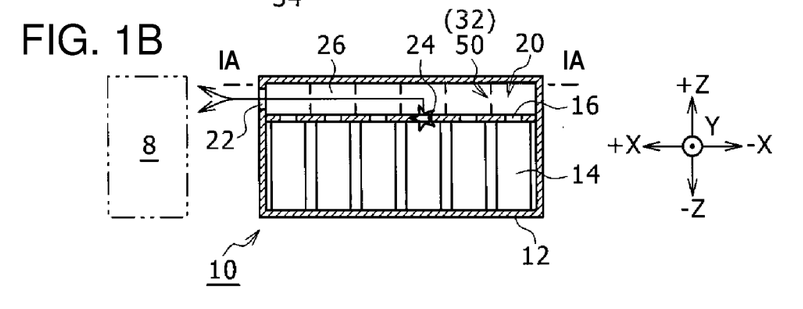
FIG. 1B is a side sectional view of a battery module in accordance with an exemplary embodiment of the present invention.

FIGS. 1A and 1B are sectional views of battery module 10. FIG. 1B is a side sectional view, and FIG. 1A is a top sectional view taken along line IA-IA of FIG. 1B. Battery module 10 includes: case body 12; a plurality of cells 14 stored in case body 12; exhaust passage 20 for releasing, to the outside of case body 12, the exhaust gas exhausted through exhaust gas valve 16 disposed in each cell 14; and flow route changing unit 50 that is disposed in exhaust passage 20 and elongates the flow route of the exhaust gas. In FIGS. 1A and 1B, the high-pressure and high-temperature gas in cells 14 gushes as exhaust gas 24 through exhaust gas valves 16 into exhaust passage 20, and exhaust gas 24 flows as flow 26 toward exhaust port 22 disposed in exhaust passage 20. FIGS. 1A and 1B show another apparatus 8 that is disposed near exhaust port 22 and can be affected by exhaust gas 24 released through exhaust port 22. Here, apparatus 8 is not a component of battery module 10.

FIGS. 1A and 1B show three directions orthogonal to each other. The X direction is parallel with the longitudinal direction of exhaust passage 20, and the upstream side of the flow of exhaust gas 24 corresponds to the −X direction and the downstream side corresponds to the +X direction. The Y direction corresponds to the width direction of cells 14, and also corresponds to the width direction of exhaust passage 20. The Z direction corresponds to the longitudinal direction of cells 14, and also corresponds to the height direction of exhaust passage 20.

Case body 12 is a battery case in which the plurality of cells 14 are stored while respective exhaust gas valves 16 are aligned in the same direction. In the example of FIGS. 1A and 1B, six cells 14 are stored. Case body 12 includes exhaust passage 20 serving as a duct chamber that covers the plurality of exhaust gas valves 16 aligned in the same direction.

As case body 12, a material having a heat resistance, an electrical insulation, and an appropriate strength is molded in a predetermined shape. Alternatively, the following process may be employed: exhaust passage 20 as a duct chamber and a battery storage unit are molded separately, and then are assembled into one body. In this case, the material of exhaust passage 20 as the duct chamber and the material of the battery storage unit can be selected independently. High-pressure and high-temperature exhaust gas 24 flows through exhaust passage 20 as the duct chamber. Therefore, as the material of exhaust passage 20, a resin having a heat resistance is used. Examples of the resin include a polybutylene terephthalate (PBT) resin, and a polyphenylene ether (PPE) resin. As the material of the battery storage unit, a resin having a heat resistance and an electrical insulation is used. Examples of the material of the battery storage unit include not only a polyethylene terephthalate (PET) resin, a polyimide (PI) resin, and a polycarbonate (PC) resin, but also a polybutylene terephthalate (PBT) resin and a polyphenylene ether (PPE) resin similarly to exhaust passage 20.

Each cell 14 is a chargeable/dischargeable secondary cell. As the secondary cell, a lithium-ion cell is employed. In addition to the lithium-ion cell, a nickel-metal-hydride cell, or an alkaline cell may be employed. In the example of FIGS. 1A and 1B, each cell 14 has an outer shape of a rectangular parallelepiped. A positive electrode terminal is disposed at one of both ends of the rectangular parallelepiped, and a negative electrode terminal is disposed at the other end. One example of each cell 14 is a lithium-ion cell having a thickness of about 18 mm and a height of 65 mm. This example is used for description, and the cell may have another shape or another dimension. For example, the cell may by a cylindrical cell having a circular cross section.

Exhaust gas valves 16 disposed in cells 14 are mechanisms having the following function: when the pressure of the gas generated by an electrochemical reaction in cells 14 exceeds a previously determined threshold pressure, exhaust gas valves 16 release the gas as exhaust gas 24 from the inside to the outside of cells 14. In the example of FIGS. 1A and 1B, exhaust gas valves 16 are disposed on the positive side of cells 14. Each exhaust gas valve 16 is disposed for each of six cells 14.

Cells 14 are arranged while the exhaust gas valve sides having exhaust gas valves 16 are aligned to one side along the height direction of cells 14. The one side means the direction having exhaust passage 20 in case body 12.

The purpose of aligning the exhaust gas valve sides to the side having exhaust passage 20 is to release exhaust gas 24 to the outside of case body 12 through exhaust passage 20 as the duct chamber when exhaust gas 24 has been exhausted through exhaust gas valves 16. In the case of FIGS. 1A and 1B, exhaust gas valves 16 are disposed on the positive sides of cells 14, so that the positive sides of cells 14 are aligned to the one side having exhaust passage 20.

Exhaust passage 20 is a space that covers the exhaust gas valve sides of cells 14, is air-tightly sealed from the outside of case body 12 except for exhaust port 22, and makes exhaust gas 24 flow along the positive-side ends of cells 14. When exhaust passage 20 is used, exhaust gas 24 exhausted through exhaust gas valves 16 can be prevented from leaking to other components, and can be passed through exhaust passage 20 and released through exhaust port 22 to the outside of case body 12.

Flow route changing unit 50 is configured of a plurality of flat plates 32 that are disposed in exhaust passage 20 and have hole 34 for passing exhaust gas 24. Flow route changing unit 50 elongates the flow route of exhaust gas 24 from the −X side toward +X side, by changing the direction of flow 26 of exhaust gas 24 a plurality of times in a zigzag manner along the Y direction. Here, the −X side means the upstream side of exhaust passage 20, the +X side means the downstream side thereof, and the Y direction means the width direction of exhaust passage 20. Thanks to exhaust passage 20, high-pressure and high-temperature exhaust gas 24 of a pressure exceeding the threshold pressure that comes through exhaust gas valves 16 in cells 14 can be speedily released to the outside of case body 12 through exhaust port 22. However, when exhaust gas 24 keeping high-pressure and high-temperature gushes through exhaust port 22, apparatus 8 that is disposed near exhaust port 22 can be damaged. A plastic component or the like constituting apparatus 8 can become deformed, for example.

In order to prevent apparatus 8 from being damaged, flow route changing unit 50 decreases the pressure and temperature of high-pressure and high-temperature exhaust gas 24 during the flowing of exhaust gas 24 through exhaust passage 20. For this purpose, exhaust gas 24 is prevented from linearly arriving at exhaust port 22, and flow 26 of the exhaust gas to exhaust port 22 is produced in a zigzag manner by passing the exhaust gas through holes 34 while making the exhaust gas collide with the plurality of flat plates 32 constituting flow route changing unit 50. Thus, the flow route from the gushing of exhaust gas 24 through exhaust gas valves 16 to the arriving at exhaust port 22 is elongated, the heat exchange is caused by collision with the plurality of flat plates 32 and passing through holes 34, the energy of high-pressure and high-temperature exhaust gas is absorbed, and thus the pressure and temperature of exhaust gas 24 are decreased.

The plurality of flat plates 32 constituting flow route changing unit 50 are arranged along the X direction so that one flat plate 32 is disposed in every gap between exhaust gas valves 16 of adjacent cells 14. In the example of FIGS. 1A and 1B, six exhaust gas valves 16 are disposed in exhaust passage 20, so that five flat plates 32 are disposed in it. This arrangement is an example for description. Depending on the specification of battery module 10, a plurality of flat plates 32 may be disposed between adjacent exhaust gas valves 16, or one flat plate 32 may be disposed for a plurality of exhaust gas valves 16.

Flat plates 32 include holes 34 for passing exhaust gas 24. In FIGS. 1A and 1B, in order to show flow 26 of exhaust gas 24, one hole 34 is disposed in one flat plate 32. However, a plurality of holes 34 may be disposed in one flat plate 32. In order to produce flow 26 of exhaust gas 24 in a zigzag manner along the Y direction as the width direction, five flat plates 32 are arranged in the following manner: the positions of holes 34 in adjacent flat plates 32 are shifted alternately in the opposite directions along the Y direction as the width direction with respect to the center line of exhaust passage 20. The width dimension of all flat plates 32 is the same as the width dimension of exhaust passage 20 in the Y direction, which is the width direction of exhaust passage 20. The height dimension of flat plates 32 is the same as the dimension of exhaust passage 20 in the Z direction, which is the height direction of exhaust passage 20. Flat plates 32 are large enough to block the flow of exhaust gas 24 in exhaust passage 20 when hole 34 is not disposed. The same is true for the following exemplary embodiment.

In order to produce each of such flat plates 32, a plate of the same material as that of exhaust passage 20 as the duct chamber can be processed into a predetermined shape. From the viewpoint of thermal conductivity and heat exchanging property, it is preferable to employ a metal material resistant to the high pressure and high temperature of exhaust gas 24. From the viewpoint of processing property, an aluminum plate is preferable. The recrystallization temperature of the aluminum plate is about 600° C., and is often lower than the high temperature of exhaust gas 24. However, exhaust gas 24 flows only for a very short time. Therefore, the deterioration of the material due to the passing of exhaust gas 24 occurs within a limited range, and hence the aluminum plate can be employed as the material of flat plates 32.

The thickness of each flat plate 32 is about 1 mm. When hole 34 for passing exhaust gas 24 is round, preferably, the dimension, namely the diameter, of the round hole is set at about 3 mm or less. When an oblique slit hole (FIG. 9) is used instead of the round hole as described later, the slit width is set at about 3 mm or less. When the hole dimension on the upstream side of exhaust passage 20 is made different from that on the downstream side (FIGS. 10A and 10B), a larger dimension and a smaller dimension are set with reference to about 3 mm. Preferably, the lower limit of the diameter when hole 34 is round and the lower limit of the slit width when hole 34 is an oblique slit hole are large enough to prevent the hole from being clogged with a material other than the gas exhausted through exhaust gas valve 16.

Figure 2:
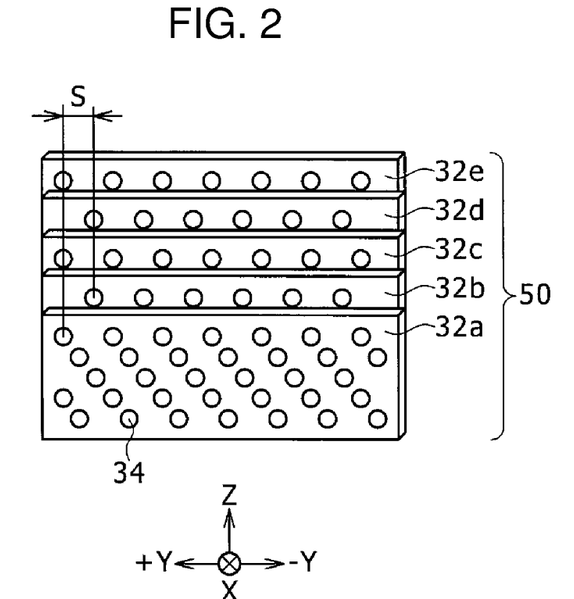
FIG. 2 is a layout drawing of a plurality of flat plates used for a flow route changing unit in the battery module in accordance with an exemplary embodiment of the present invention.

FIG. 2 shows a diagram of flow route changing unit 50 in the view from the upstream side of exhaust passage 20 to the downstream side thereof. In flow route changing unit 50, five flat plates 32a, 32b, 32c, 32d, and 32e are arranged in this sequence from the upstream side to the downstream side of exhaust passage 20. A plurality of holes 34 are disposed in each of five flat plates 32a, 32b, 32c, 32d, and 32e. Five flat plates 32a, 32b, 32c, 32d, and 32e are basically the same, and the outer shapes and arrangements of the plurality of holes 34 are exactly the same.

Flat plate 32a and flat plate 32b have the same outer shape, but are arranged so that the positions of holes 34 are shifted from each other by dimension S in the Y direction. One hole 34 in flat plate 32b corresponding to one hole 34 in flat plate 32a is shifted from the latter hole by dimension S in the −Y direction. Dimension S is equivalent to the phase difference between the hole positions of the plurality of flat plates.

Flat plate 32c is the same as flat plate 32a, and their hole positions are the same. Therefore, one hole 34 in flat plate 32c corresponding to one hole 34 in flat plate 32b is shifted from the latter hole by dimension S in the +Y direction.

Flat plate 32d is the same as flat plate 32b, and their hole positions are the same. Therefore, one hole 34 in flat plate 32d corresponding to one hole 34 in flat plate 32c is shifted from the latter hole by dimension S in the −Y direction.

Flat plate 32e is the same as flat plates 32c and 32a, and their hole positions are the same. Therefore, one hole 34 in flat plate 32e corresponding to one hole 34 in flat plate 32d is shifted from the latter hole by dimension S in the +Y direction.

In the arrangement of FIG. 2, the positions of corresponding holes 34 in five flat plates 32a, 32b, 32c, 32d, and 32e are shifted in the opposite directions, namely −S, +S, −S, and +S, from the upstream side to the downstream side of exhaust passage 20. By using flow route changing unit 50 having the configuration of FIG. 2, flow 26 of exhaust gas 24 flowing through exhaust passage 20 is produced in a zigzag manner along the Y direction from the upstream side to the downstream side of exhaust passage 20.

Flow route changing unit 50 elongates the flow route of exhaust gas 24 by producing flow 26 of exhaust gas 24 in a zigzag manner, so that flow route changing unit 50 may have a configuration other than those of FIGS. 1A and 1B, and FIG. 2. Hereinafter, the examples of the configuration for elongating the flow route of exhaust gas 24 are described using FIG. 3A to FIG. 10B. FIG. 3A to FIG. 7B and FIGS. 10A and 10B are diagrams for schematically showing the flow of exhaust gas 24 in respective configurations. In these diagrams, exhaust passage 20 is extracted, and FIGS. 3A, 4A, 5A, 6A, 7A, and 10A each show a top sectional view and FIGS. 3B, 4 B, 5 B, 6 B, 7 B, and 10 B each show a side sectional view. Each of these diagrams shows the X direction, Y direction, and Z direction. The number of holes 34 for passing exhaust gas 24 is one for one flat plate, but this configuration is an example for description. As shown in FIG. 2, a plurality of holes 34 may be formed in one flat plate.

Figure 3A:
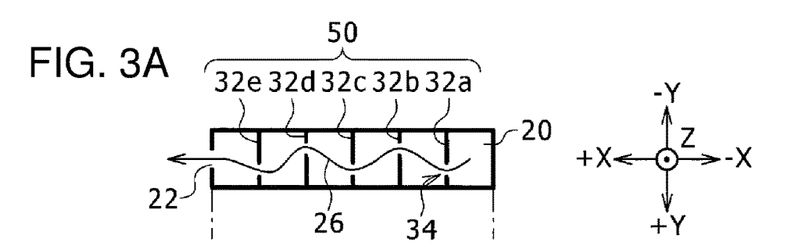
FIG. 3A is a top sectional view of a diagram showing the exhaust gas flow depending on a layout of the plurality of flat plates of FIG. 2.
Figure 3B:
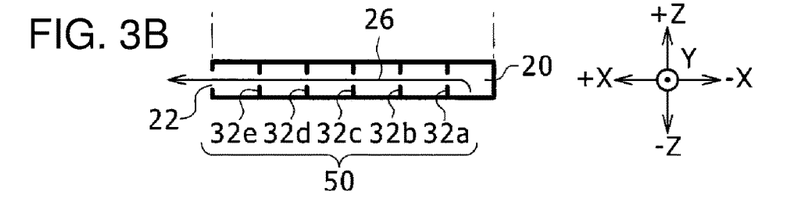
FIG. 3B is a side sectional view of a diagram showing the exhaust gas flow depending on a layout of the plurality of flat plates of FIG. 2.

FIGS. 3A and 3B schematically show the configuration of flow route changing unit 50 in FIGS. 1A and 1B, and FIG. 2. In flow route changing unit 50, five flat plates 32a, 32b, 32c, 32d, and 32e are arranged perpendicularly to all of the bottom surface, ceiling surface, and both side surfaces of exhaust passage 20 having a rectangular cross section. The positions of holes 34 in adjacent flat plates 32 are alternately shifted in the opposite directions, namely the +Y direction and the −Y direction, along the Y direction as the width direction of exhaust passage 20. The positions of holes 34 along the Z direction as the height direction of exhaust passage 20 are constant. In flow route changing unit 50, flow 26 of exhaust gas 24 is produced in a zigzag manner along the width direction of exhaust passage 20.

Figure 4A:
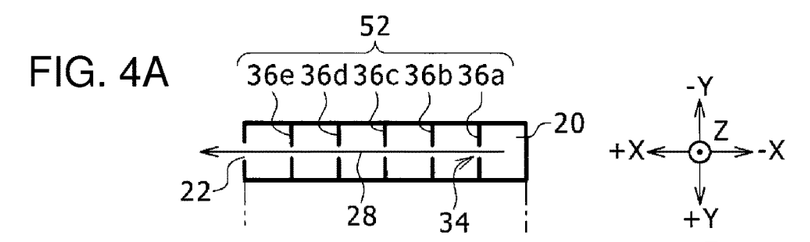
FIG. 4A is a top sectional view of a diagram showing a flat plate layout different from that of FIG. 2.
Figure 4B:
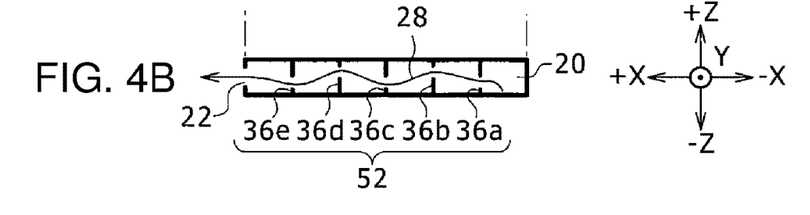
FIG. 4B is a side sectional view of a diagram showing a flat plate layout different from that of FIG. 2.

In flow route changing unit 52 of FIGS. 4A and 4B, five flat plates 36a, 36b, 36c, 36d, and 36e are arranged so that the positions of holes 34 in adjacent flat plates are alternately shifted in the opposite directions, namely the +Z direction and the −Z direction, along the Z direction as the height direction of exhaust passage 20. The positions of holes 34 along the Y direction as the width direction of exhaust passage 20 are constant. In flow route changing unit 52, flow 28 of exhaust gas 24 is produced in a zigzag manner along the height direction of exhaust passage 20. Flow route changing unit 52 corresponds to a unit obtained by switching, between the width direction and the height direction, the shift positional relation of holes 34 in flow route changing unit 50 of FIGS. 3A and 3B.

In the above configurations, five flat plates are perpendicular to all of the bottom surface, ceiling surface, and both side surfaces of exhaust passage 20 having a rectangular cross section. FIGS. 5A and 5B and FIGS. 6A and 6B show the examples in which five flat plates are inclined and arranged.

Figure 5A:
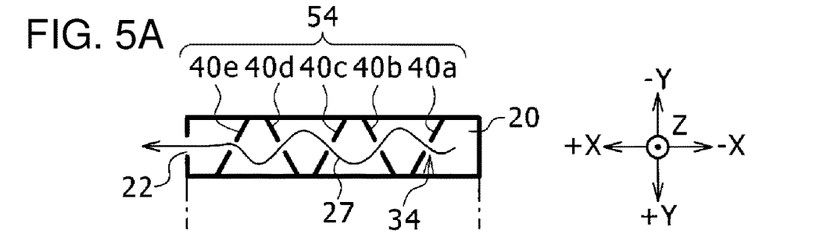
FIG. 5A is a top sectional view of a diagram showing the exhaust gas flow when the same flat plates as those of FIG. 2 are inclined with respect to an exhaust passage.
Figure 5B:
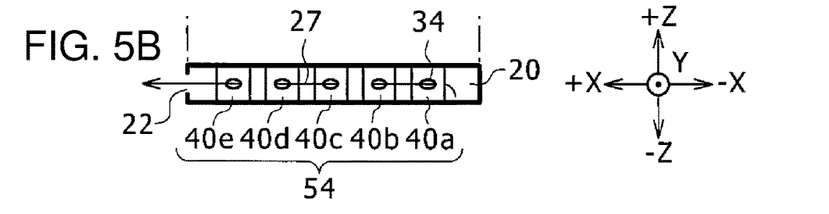
FIG. 5B is a side sectional view of a diagram showing the exhaust gas flow when the same flat plates as those of FIG. 2 are inclined with respect to an exhaust passage.

In flow route changing unit 54 of FIGS. 5A and 5B, five flat plates 40a, 40b, 40c, 40d, and 40e are arranged so as to be perpendicular to the bottom surface and the ceiling surface of exhaust passage 20 having a rectangular cross section and so as to be inclined with respect to both side surfaces. The pointing directions of holes 34 in adjacent flat plates are opposite from each other in the Y direction as the width direction with respect to the center line of exhaust passage 20. In the example of FIGS. 5A and 5B, flat plates 40a, 40c, and 40e face exhaust port 22 and are slightly turned right with respect to the center line of exhaust passage 20, and flat plates 40b and 40d face exhaust port 22 and are slightly turned left with respect to the center line of exhaust passage 20. The positions of holes 34 along the Y direction as the width direction of exhaust passage 20 and the Z direction as the height direction are constant.

In flow route changing unit 54, exhaust gas 24 having passed through hole 34 in flat plate 40a gushes perpendicularly to the surface of flat plate 40a. Then, exhaust gas 24 bumps against the right surface of exhaust passage 20, is turned toward the left surface of exhaust passage 20, and passes through hole 34 in flat plate 40b. Exhaust gas 24 having passed through hole 34 in flat plate 40b gushes perpendicularly to the surface of flat plate 40b. Then, exhaust gas 24 bumps against the left surface of exhaust passage 20, is turned toward the right surface of exhaust passage 20, and passes through hole 34 in flat plate 40c. When this process is repeated, flow 27 of exhaust gas 24 is produced in a zigzag manner along the width direction of exhaust passage 20.

Figure 6A:
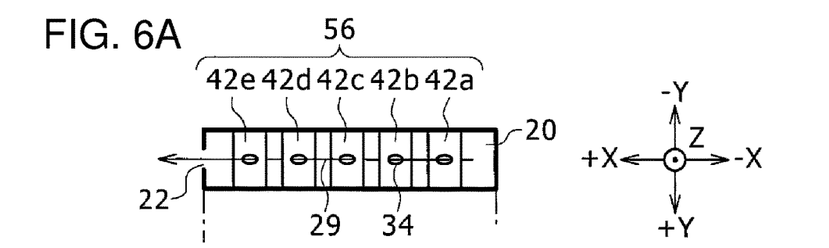
FIG. 6A is a top sectional view of a diagram showing an inclination layout different from that of FIGS. 5A and 5B.
Figure 6B:
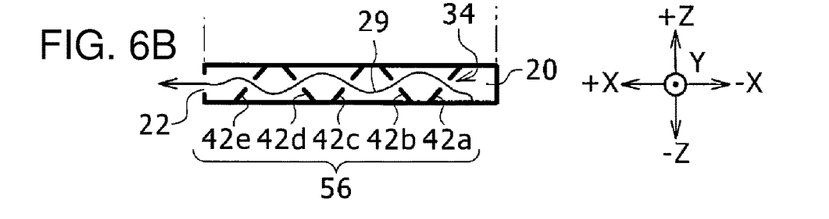
FIG. 6B is a side sectional view of a diagram showing an inclination layout different from that of FIGS. 5A and 5B.

In flow route changing unit 56 of FIGS. 6A and 6B, five flat plates 42a, 42b, 42c, 42d, and 42e are arranged so as to be perpendicular to both side surfaces of exhaust passage 20 having a rectangular cross section and be inclined with respect to the bottom surface and the ceiling surface. The pointing directions of holes 34 in adjacent flat plates are opposite from each other in the Z direction as the height direction with respect to the center line of exhaust passage 20. In the example of FIGS. 6A and 6B, flat plates 42a, 42c, and 42e face the ceiling surface of exhaust passage 20, and flat plates 42b and 42d face the bottom surface of exhaust passage 20. The positions of holes 34 along the Y direction as the width direction of exhaust passage 20 and the Z direction as the height direction are constant.

In flow route changing unit 56, exhaust gas 24 having passed through hole 34 in flat plate 42a gushes perpendicularly to the surface of flat plate 42a. Then, exhaust gas 24 bumps against the ceiling surface of exhaust passage 20, is turned toward the bottom surface of exhaust passage 20, and passes through hole 34 in flat plate 42b. Exhaust gas 24 having passed through hole 34 in flat plate 42b gushes perpendicularly to the surface of flat plate 42b. Then, exhaust gas 24 bumps against the bottom surface of exhaust passage 20, is turned toward the ceiling surface of exhaust passage 20, and passes through hole 34 in flat plate 42c. When this process is repeated, flow 29 of exhaust gas 24 is produced in a zigzag manner along the height direction of exhaust passage 20.

Figure 7A:
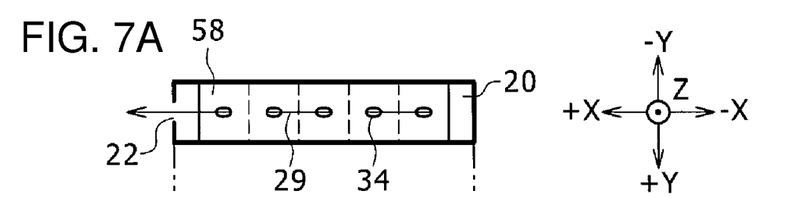
FIG. 7A is a top sectional view of a diagram showing the exhaust gas flow when the plurality of flat plates of FIGS. 6A and 6B are interconnected and arranged.
Figure 7B:
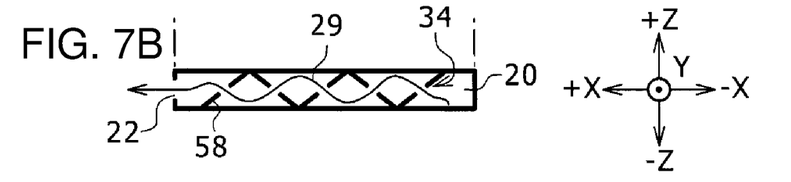
FIG. 7B is a side sectional view of a diagram showing the exhaust gas flow when the plurality of flat plates of FIGS. 6A and 6B are interconnected and arranged.
Figure 8:
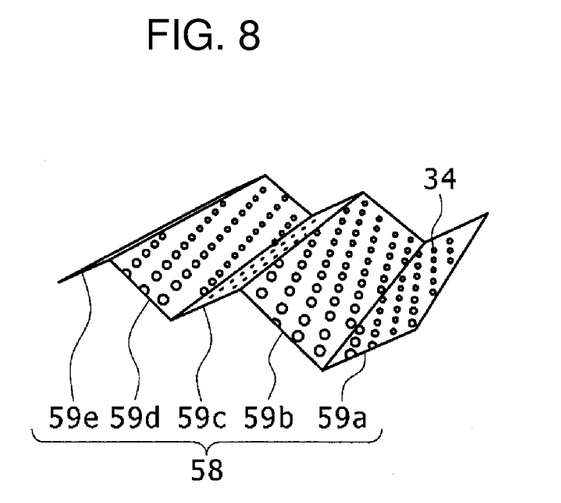
FIG. 8 is a perspective view of an integrated flat plate portion formed by integrating the plurality of flat plates of FIGS. 7A and 7B.

In FIGS. 5A and 5B, and FIGS. 6A and 6B, five flat plates are described as independent members. However, the five flat plates arranged so as to face each other may be integrated. In FIGS. 7A and 7B, integrated flat plate portion 58 including five inclined flat plates that are formed by folding one flat board four times is applied to flow route changing unit 56 of FIGS. 6A and 6B. FIG. 8 is a perspective view of integrated flat plate portion 58. Integrated flat plate portion 58 includes five flat plates 59a, 59b, 59c, 59d, and 59e that are integrally formed by alternately repeating the inward folding and outward folding of one flat board having a plurality of holes 34. Such integrated flat plate portion 58 may be formed by folding one punching metal into a predetermined shape and dimension. As the material of the punching metal, it is preferable to employ aluminum. FIGS. 7A and 7B show the example in which integrated flat plate portion 58 is applied to FIGS. 6A and 6B. However, integrated flat plate portion 58 may be applied to FIGS. 5A and 5B.

In the above-mentioned examples, holes 34 for passing exhaust gas 24 are round holes. However, holes 34 may be long holes instead of the round holes. Alternatively, one oblique slit hole may be formed by interconnecting five round holes (FIG. 2) that are arranged obliquely with respect to the height direction, namely from +Z direction to −Z direction.

Figure 9:
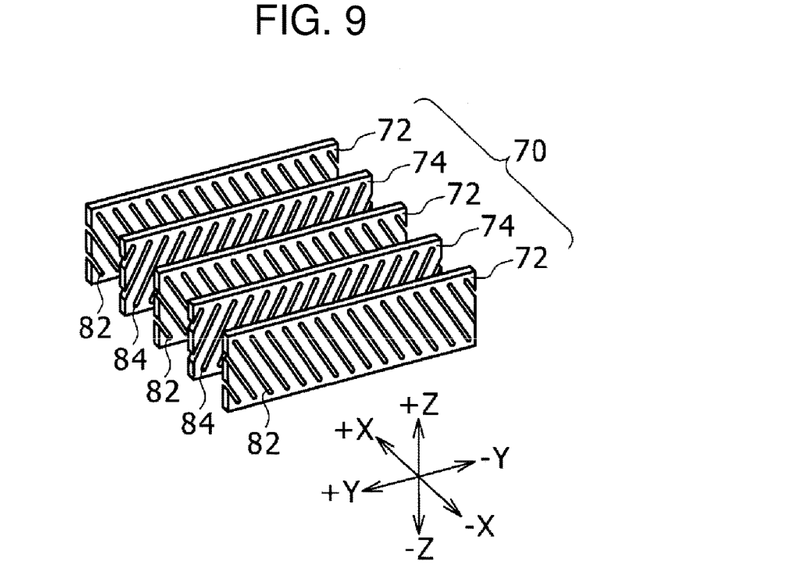
FIG. 9 is a diagram showing an example in which a hole for passing the exhaust gas is an oblique slit hole in the battery module in accordance with the exemplary embodiment of the present invention.

Flow route changing unit 70 of FIG. 9 includes flat plates 72 and 74 each of which has oblique slit holes for passing exhaust gas. The oblique slit holes are inclined with respect to the Z direction as the height direction. As described in FIGS. 3A and 3B, and FIGS. 4A and 4B, adjacent flat plates may be arranged so as to be shifted from each other in the width direction or height direction. FIG. 9 shows flat plate 72 having right-down oblique slit holes 82 that extend from the +Y direction to the −Y direction (width direction) and from the +Z direction to the −Z direction (height direction), and flat plate 74 having right-up oblique slit holes 84 that are reverse to right-down oblique slit holes 82.

In flow route changing unit 70 of FIG. 9, flat plate 72, flat plate 74, flat plate 72, flat plate 74, and flat plate 72 are arranged from the upstream side to the downstream side of the X direction. Three flat plates 72 and two flat plates 74 are arranged perpendicularly to all of the bottom surface, ceiling surface, and both side surfaces of exhaust passage 20 having a rectangular cross section. In this arrangement, for example, exhaust gas 24 having passed through right-down oblique slit hole 82 cannot go straight in the X direction in entering right-up oblique slit hole 84 on its downstream side, and the flow direction of exhaust gas 24 is turned to the width direction or the height direction. When this process is repeated, exhaust gas 24 flows in a zigzag manner along the width direction or the height direction of exhaust passage 20.

FIG. 9 is obtained by replacing, with flat plates having oblique slit holes, the flat plates having a round hole that are described in FIGS. 3A and 3B, and FIGS. 4A and 4B, and are arranged perpendicularly to both side surfaces or the bottom surface of exhaust passage 20. However, the flat plates having a round hole that are described in FIGS. 5A to 7B and are arranged so as to be inclined with respect to both side surfaces or the bottom surface of exhaust passage 20 may be replaced with flat plates having oblique slit holes.

In the above-mentioned examples, the dimensions of the holes in the flat plates are the same. However, it is preferable that the hole dimension on the downstream side of exhaust passage 20 is smaller than that on the upstream side of exhaust passage 20. Preferably, the hole dimension is gradually decreased from the upstream side to the downstream side of exhaust passage 20. In this configuration, high-pressure and high-temperature exhaust gas 24 can be made to flow at a high speed on the upstream side and at a low speed on the downstream side, so that exhaust gas 24 can be speedily released and the pressure and temperature can be efficiently decreased. The hole dimension means the diameter for a round hole, and means the slit width for an oblique slit hole.

Figure 10A:
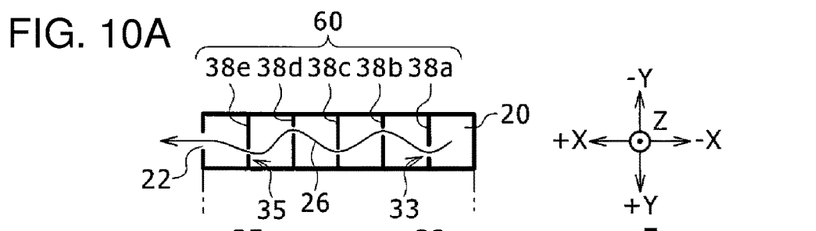
FIG. 10A is a top sectional view of a diagram showing the exhaust gas flow when the diameters of the holes in the flat plates that pass the exhaust gas in FIGS. 3A and 3B are decreased from the upstream side to the downstream side.
Figure 10B:
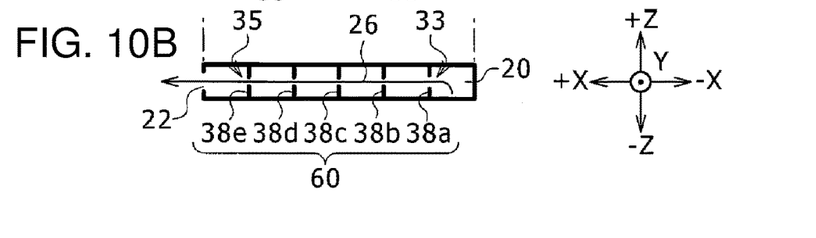
FIG. 10B is a side sectional view of a diagram showing the exhaust gas flow when the diameters of the holes in the flat plates that pass the exhaust gas in FIGS. 3A and 3B are decreased from the upstream side to the downstream side.

Flow route changing unit 60 of FIGS. 10A and 10B has a configuration similar to that of FIGS. 3A and 3B, and the hole dimension is gradually decreased from the upstream side to the downstream side of exhaust passage 20. In flow route changing unit 60, similarly to the configuration of FIGS. 3A and 3B, five flat plates 38a, 38b, 38c, 38d, and 38e are arranged perpendicularly to all of the bottom surface, ceiling surface, and both side surfaces of exhaust passage 20 having a rectangular cross section. The positions of the holes in adjacent flat plates are alternately shifted in the opposite directions, namely the +Y direction and the −Y direction, along the Y direction as the width direction of exhaust passage 20. The positions of the holes along the Z direction as the height direction of exhaust passage 20 are constant. In flow route changing unit 60, flow 26 of exhaust gas 24 is produced in a zigzag manner along the width direction of exhaust passage 20.

The diameter of hole 33 in flat plate 38a on the most upstream side of exhaust passage 20 is the largest, the diameters of the holes in flat plates 38b, 38c, and 38d gradually decrease in this sequence toward the downstream side, and the diameter of hole 35 in flat plate 38e on the most downstream side of exhaust passage 20 is the smallest.

In FIGS. 10A and 10B, the diameters of the holes in the configuration of FIGS. 3A and 3B are decreased from the upstream side to the downstream side in exhaust passage 20. However, the dimensions of the holes may be decreased from the upstream side to the downstream side in exhaust passage 20 also in the configurations of FIGS. 4A to 7B, and FIGS. 10A and 10B.

In battery module 10 of the present invention, the pressure and temperature of high-pressure and high-temperature exhaust gas 24 coming from cells 14 can be efficiently decreased, and exhaust gas 24 can be released to the outside through exhaust port 22. Therefore, damage of an apparatus near exhaust port 22 can be suppressed.

In the above-mentioned examples, exhaust passage 20 is assumed as a duct facing exhaust gas valves 16 of cells 14, but exhaust gas 24 can flow between the outer shapes of cells 14 and the inner wall of case body 12. Therefore, depending on the configuration of battery module 10, the space between the outer shapes of cells 14 and the inner wall of case body 12 is assumed as an exhaust passage, and a flow route changing unit is disposed in this space.

In the above-mentioned examples, exhaust passage 20 is assumed as a rectangular duct space. Exhaust passage 20 may have another configuration. For example, the exhaust passage may have a bent portion in front of the exhaust port, or the exhaust passage may smoothly bend to the exhaust port.

The invention claimed is:

1. A battery module comprising:
   a case body for storing a plurality of cells each having an exhaust gas valve;
   an exhaust passage for releasing an exhaust gas to an outside of the case body, the exhaust gas having come from the plurality of cells; and
   a flow route changing unit disposed in the exhaust passage, the flow route changing unit being used for elongating a flow route of the exhaust gas from an upstream side to a downstream side of the exhaust passage by changing a flow direction of the exhaust gas a plurality of times in a zigzag manner along at least one direction of a width direction and a height direction of the exhaust passage,
   wherein the flow route changing unit includes a plurality of plate portions, each of the plurality of plate portions includes a plurality of paths for passing the exhaust gas.

2. The battery module according to claim 1, wherein
   the plurality of plate portions are a plurality of flat plates and the plurality of paths comprise holes for passing the exhaust gas, the plurality of flat plates being arranged from the upstream side to the downstream side of the exhaust passage, and
   positions of the holes in adjacent flat plates, of the plurality of flat plates, are shifted alternately in opposite directions along the width direction or the height direction with respect to a center line of the exhaust passage.

3. The battery module according to claim 1, wherein
   the plurality of plate portions are a plurality of flat plates, and the plurality of paths comprise holes for passing the exhaust gas, the plurality of flat plates being inclined and arranged from the upstream side to the downstream side of the exhaust passage, and
   pointing directions of the holes in adjacent flat plates, of the plurality of flat plates, are opposite from each other along the width direction or the height direction with respect to a center line of the exhaust passage.

4. The battery module according to claim 3, wherein
   the flow route changing unit includes an integrated flat plate portion including the plurality of flat plates inclined with respect to each other, the plurality of flat plates being formed by folding one flat board.

5. The battery module according to claim 1, wherein
   each of the plurality of paths for passing the exhaust gas in the flow route changing unit includes an oblique slit hole inclined with respect to the height direction.

6. The battery module according to claim 1, wherein
   the plurality of plate portions are a plurality of flat plates, the paths includes holes for passing the exhaust gas, the plurality of flat plates being arranged from the upstream side to the downstream side of the exhaust passage, the holes each including an oblique slit hole inclined with respect to the height direction, and
   inclined directions of the oblique slit holes in adjacent flat plates, of the plurality of flat plates, are opposite from each other along the height direction.

7. The battery module according to claim 2, wherein
   in the flow route changing unit, a dimension of the hole in the flat plate on the upstream side, of the plurality of flat plates, is larger than a dimension of the hole in the flat plate on the downstream side, of the plurality of flat plates.

8. The battery module according to claim 3, wherein
   in the flow route changing unit, a dimension of the hole in the flat plate on the upstream side, of the plurality of flat plates, is larger than a dimension of the hole in the flat plate on the downstream side, of the plurality of flat plates.

9. The battery module according to claim 4, wherein
in the flow route changing unit, a dimension of the hole in the flat plate on the upstream side, of the plurality of flat plates, is larger than a dimension of the hole in the flat plate on the downstream side, of the plurality of flat plates.

10. The battery module according to claim 5, wherein
in the flow route changing unit, a dimension of the hole in the flat plate on the upstream side, of the plurality of flat plates, is larger than a dimension of the hole in the flat plate on the downstream side, of the plurality of flat plates.

11. The battery module according to claim 6, wherein
in the flow route changing unit, a dimension of the hole in the flat plate on the upstream side, of the plurality of flat plates, is larger than a dimension of the hole in the flat plate on the downstream side, of the plurality of flat plates.

* * * * *